United States Patent [19]

Henderson

[11] Patent Number: 5,069,198

[45] Date of Patent: Dec. 3, 1991

[54] FOOD STEAMING APPARATUS

[76] Inventor: Henning M. Henderson, No. 2 Club View, Cnr. Nigel & Hills Roads, Selection Park, Springs, Transvaal Province, South Africa

[21] Appl. No.: 550,904

[22] Filed: Jul. 11, 1990

[30] Foreign Application Priority Data

Jul. 12, 1989 [ZA] South Africa .................. 89/5286

[51] Int. Cl.$^5$ ............................................. F24D 1/00
[52] U.S. Cl. .................................. 126/369; 126/348; 126/377
[58] Field of Search ............... 126/369, 348, 373, 377

[56] References Cited

U.S. PATENT DOCUMENTS

| | | | |
|---|---|---|---|
| 3,592,668 | 7/1971 | Denk | 126/369 X |
| 3,949,733 | 4/1976 | Miller et al. | 126/369 X |
| 4,106,486 | 8/1978 | Lee | 126/369 |
| 4,401,017 | 8/1983 | Feld | 126/369 X |
| 4,649,811 | 3/1987 | Manganese | 126/369 X |
| 4,739,698 | 4/1988 | Allaire | 126/369 X |
| 4,892,030 | 1/1990 | Grieve | 126/21 A X |

Primary Examiner—Larry Jones
Attorney, Agent, or Firm—Stevens, Davis, Miller & Mosher

[57] ABSTRACT

Food steaming apparatus is provided in which a food support member, generally orientated horizontally, is provided with perforations therethrough having deflector zones associated therewith. The deflector zones are arranged such that, in use, steam rising vertically to pass through the perforations is provided with a transverse component to its direction of movement. The arrangement is preferably one in which the deflector zones impart a swirling motion to steam passing through the food support. The invention also provides a divider for inclusion in the tubular body, the divider having perforated walls similarly provided with deflector zones for promoting a swirling action of steam whereby cooking is effected.

18 Claims, 3 Drawing Sheets

FOOD STEAMING APPARATUS

FIELD OF THE INVENTION

This invention relates to food steaming apparatus and, more particularly, to food steaming apparatus which includes perforated dividing or supporting walls through which steam is to pass during its passage through the food steaming apparatus. The walls may assume the form of food supports within a tubular body of the apparatus and through which the steam is to pass in use, or alternatively, the walls of a divider, generally vertically orientated in use, for separating different types of foods being steamed.

BACKGROUND TO THE INVENTION

Food steaming apparatus of the type comprising a tubular body having an optionally removable, perforated food support at a lower end region thereof, is well known. A divider having walls adapted to be substantially vertically orientated in use for maintaining different types of foods separate from each other during the steaming operation, is also known.

Such food steaming apparatus can include a plurality of vertically spaced perforated food supports each of which may receive a divider and, in a preferred form, the apparatus includes a lid having one or more outlet perforations therethrough. A number of different food steaming apparatuses of this general nature have been proposed heretofore.

Generally speaking, steam tends to rise substantially vertically but, when obstructed by the presence of food, the steam must make its way around the obstruction. In order to assist in the distribution of steam and, assist in this movement around the obtructions caused by the food, it has been proposed to perforate the walls of any divider which may be employed on a food support in such apparatus. Perforating the walls of the divider has been found to assist in this regard.

It is the object of this invention to provide food steaming apparatus of the general type outlined above in which the passage of steam through the body of the apparatus is rendered more effective for the purposes of cooking or heating food.

SUMMARY OF THE INVENTION

In accordance with this invention there is provided food steaming apparatus comprising a tubular body and including at least one perforated food support and, optionally, a divider having perforated walls for use in association therewith, the apparatus being characterized in that at least either the food support or any divider for use in association therewith, has perforations shaped to impart a transverse component to the direction of travel of steam rising substantially vertically prior to passage through such perforations.

Further features of the invention provide for each of the perforations to have a deflector zone adjacent same, the deflector zone extending out of the plane of the perforated food support or divider, as the case may be; for the deflector zones to be integral with the perforated food support or divider and to have a free edge defining part of the periphery of an aperture to the associated perforation transverse to the plane of the perforated food support or divider; and for the deflector zones to be inclined to the plane of the perforated food support or divider and to decrease in cross-sectional size from the aperture towards the food support or divider.

Still further features of the invention provide for the food support or divider to be made of sheet metal, in which case perforations are formed therein by forming cuts in the sheet material and deforming the material in the vicinity of the cut on one side thereof out of the plane of the sheet to provide deflector zones terminating in apertures to the perforations located in a plane substantially at right angles to the sheet; for the said deflector zones and apertures to the perforations to be directed downwardly in the case of the walls of a divider; and for said deflector zones and apertures to the perforations to be directed all in the same direction relative to a central point, in particular, a circumferential direction in respect of a substantially circular food support.

In a preferred form of the invention the tubular body is adapted to be supported on a perforated support member of dished configuration and adapted to be carried by the upper edge of a substantially conventional cooking pot and for the food steaming apparatus to be provided with a lid having outlet apertures therethrough.

Alternatively, the use of a dished support member may be avoided by providing a flange or brackets on the tubular body, the flange or brackets being arranged to engage the top of a pot to support the body thereon. It is preferred, in this case, that the flange or brackets be internal so that it can also support a removable food support on the upper surface thereof.

It is preferred that both a food support and a divider for use in association therewith be provided with perforations as above defined such that in use, a circumferential swirling action is imparted to steam passing through the food steaming apparatus in use. The provision of a lid having outlet apertures at the upper end of the food steaming apparatus ensures that a continuous flow of steam passes through the apparatus in a swirling action promoted by the specially shaped perforations through the food support and divider. The food steaming apparatus may comprise a single food support member or, alternatively, a plurality of food support members optionally adapted to be supported in a single tubular body or each in its own tubular body which is releasably supportable on a subjacent tubular body so that a plurality of vertically spaced food supports are provided in the composite apparatus.

In order that the invention may be more fully understood two embodiments thereof will now be described with reference to the accompanying drawings.

DETAILED DESCRIPTION WITH REFERENCE TO THE DRAWINGS

Figure 1:
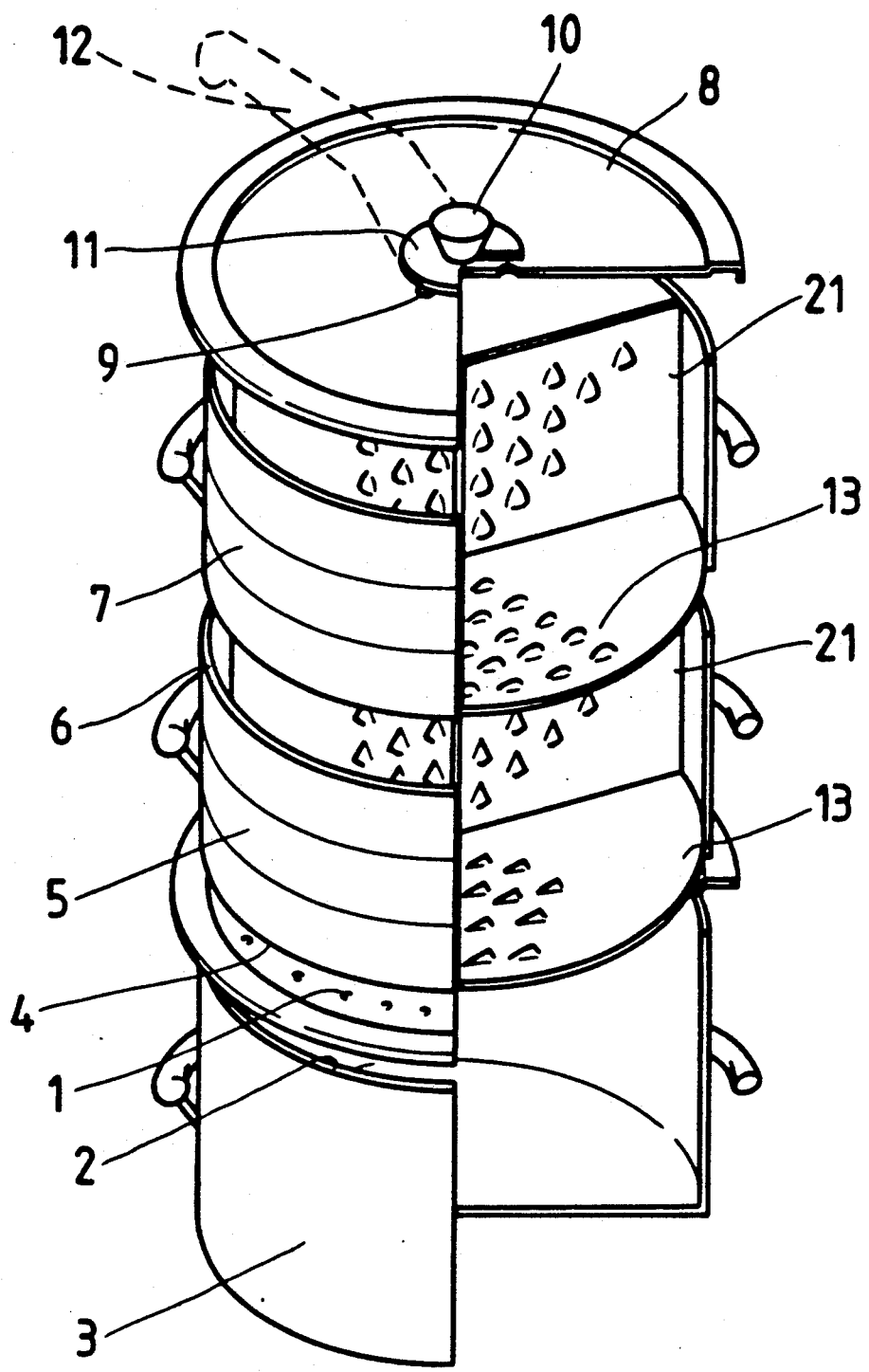
FIG. 1 is an exploded, partly sectioned, isometric view of food steaming apparatus according to the invention in association with a conventional cooking pot.

In the embodiment of the invention illustrated in FIGS. 1 to 4a, food steaming apparatus comprises an operatively lowermost, smoothly dished, support member 1, perforated to allow steam to pass upwardly therethrough, and adapted to be supported on the upper edge 2 of a substantially conventional cooking pot 3.

The support member 1 is adapted to support the lower edge 4 of a tubular body 5 of the food steaming apparatus and the tubular body 5 is adapted to support releasably, at its upper end 6, a second tubular body 7. Such second tubular body 7 may be used if required, or the lowermost body 5 may be used on its own depending upon requirements.

A lid 8 is provided for use on the top of the second tubular body 7, where it is used or, alternatively, on the top 6 of the first tubular body 5 where only that one is used. The lid 8 has outlet perforations 9 therethrough to provide for the escape of steam from the apparatus and, preferably, a central handle 10 is provided and a surrounding shield 11 for preventing steam emitting from the holes 9 from contacting a person's hand when the handle is employed for lifting the lid. Alternatively, a radially extending handle 12 could be used.

Each of the tubular bodies of the food steaming apparatus has releasably supported in the lower region thereof a food support member 13 made of sheet metal and pressed to provide a multitude of radially extending short cuts 14 with the metal 15 on one side of the cut and over a substantially triangular area, being deformed out of the plane of the support 13 to provide an upwardly inclined deflector zone 16 extending from the under-surface 17 of the food support 13 to an aperture 18 encircled by the cut edges. The aperture 18 is, accordingly, directed substantially at right angles to the plane of the support 13.

Figure 3:
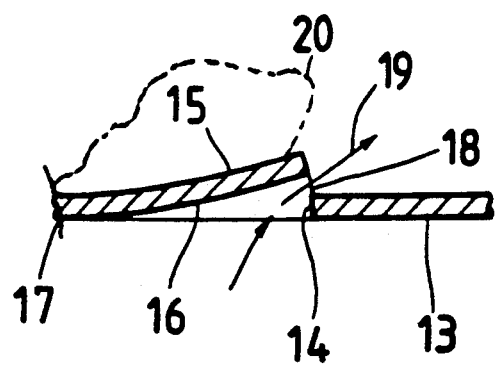
FIG. 3 is a similar view through one perforation of a food support of the food steaming apparatus.

It will be understood that steam rising vertically and passing through an aperture 18 as described will have a lateral component of movement imparted thereto as indicated by the arrow 19 in FIG. 3.

Figure 4A:
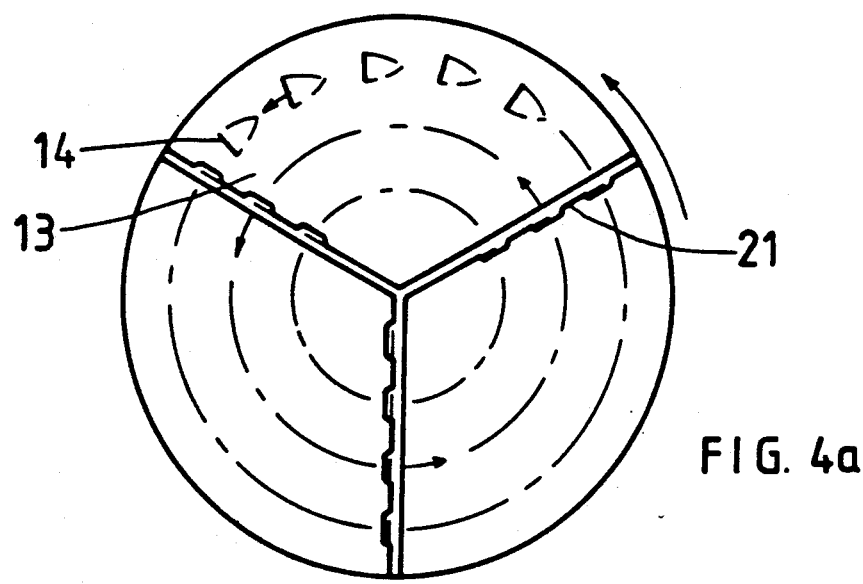
FIGS. 4a, 4b and 4c are each a plan view of a food support (and in the case of FIG. 4a a divider in association therewith) indicating the general circumferential, radial, or intermediate direction in which the flow of steam is promoted.

In respect of the food support illustrated in FIG. 4a all the apertures are directed in the same circumferential direction so that steam passing through the perforated food support will have a spiralling or swirling action imparted thereto.

Figure 4B:
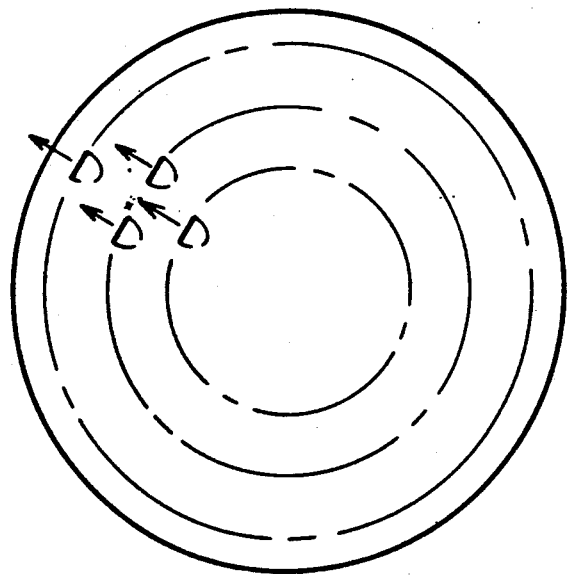
Figure 4C:
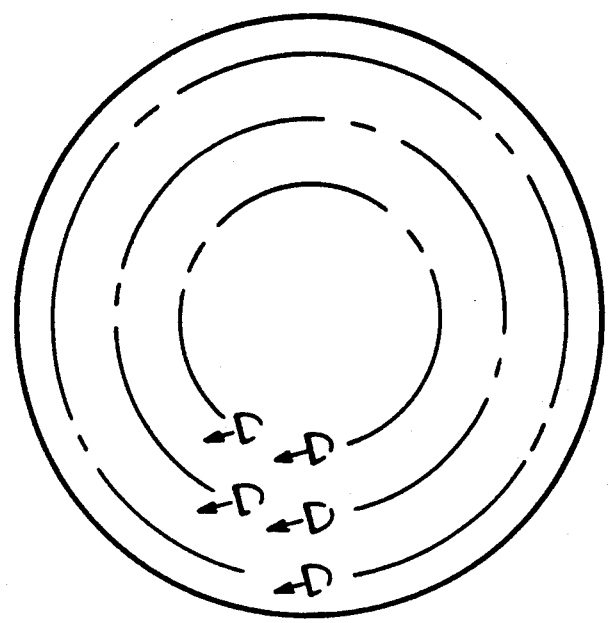

In respect of the food supports illustrated in FIGS. 4b and 4c they are directed radially and in a direction in between radial and circumferential, respectively.

It is to be mentioned that an added advantage of the arrangement described above is that the outwardly deformed areas of metal 15 are elevated relative to the plane of the food support and, accordingly, food (indicated by numeral 20) cannot obscure the aperture 18 to the perforation in any way. This is an advantage over the prior art wherein some apertures on which food has rested are totally blinded to the passage of steam.

Figure 2:
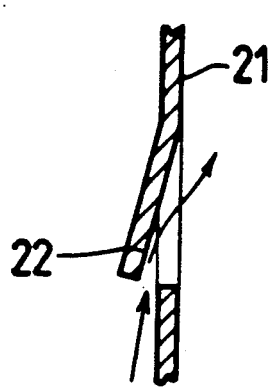
FIG. 2 is a detailed sectional elevation through one perforation of a wall of a divider.

The removable divider 21 is provided for association with each of the food supports 13 as and when required and the walls of each divider are provided with perforations therethrough formed in exactly the same way as described with reference to FIG. 3 but with the apertures thereto directed downwardly, as indicated most clearly by numeral 22 in FIG. 2. Once again the deflector zones are all formed to impart a transverse component to the direction of flow of rising steam and, in this case, the divider having three walls, the apertures in each wall are arranged to impart such transverse component in the same circumferential direction.

Thus, as indicated in FIG. 4a, with the divider and food support in position, a circumferential swirling action will be imparted to steam rising through the steaming apparatus both by virtue of the arrangement of apertures in the food support as well as those in the walls of the divider, when same is in use.

Figure 6:
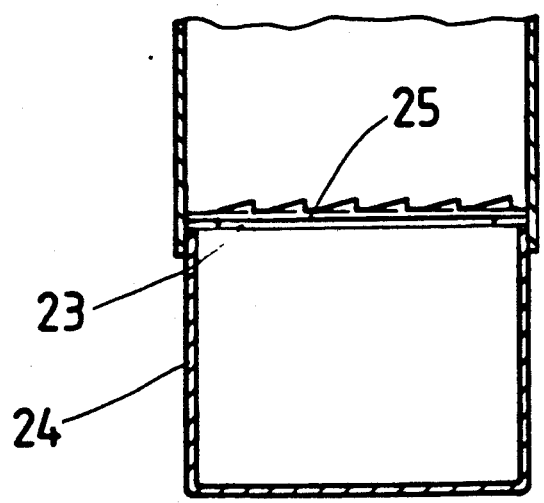
FIG. 6 is a schematic sectional elevation of a second embodiment of the invention.

One alternative embodiment of the invention employs the same food supports and dividers but does away with the perforated support member. As shown in FIG. 6, this is achieved by providing an inwardly directed flange 23 on the body towards its lower end. Such flange can then support the body on the upper edge of a pot 24 and can simultaneously support the food support 25 in the body. Alternative to the flange brackets could be used.

Figure 5:
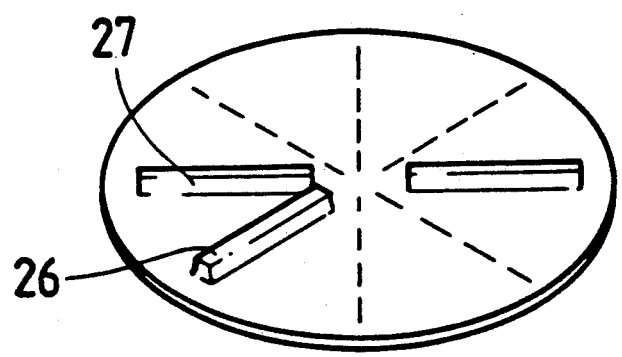
FIG. 5 Illustrates an alternative perforations.

Also, the shape of the perforations may be varied widely and may even assume the form of a slot 26 as shown in FIG. 5. In this case the deflector zones 29 extend along the length of slot. These deflector zones may thus form a configuration similar to the blades of a turbine.

It will be understood that numerous variations may be made to the above described embodiment of the invention without departing from the scope hereof which is limited only to the special arrangement of the perforations through the food support member and walls of a divider whereby a transverse component is imparted to steam passing through such walls in use.

The scope of this invention also therefore extends to food supports per se, dividers per se, as well as to any combination of food supports, dividers and associated bodies whether the food supports be fixed relative to the bodies or removable therefrom.

What I claim as new and desire to secure by Letters Patent is:

1. Food steaming apparatus comprising a tubular body and at least one generally horizontally extending perforated food support, said food support including means for imparting a transverse component to the direction of travel of steam rising substantially vertically prior to passage through said perforations said means for imparting comprising deflector zones adjacent said perforations, said deflector zones being positioned to guide the steam through the perforations.

2. The apparatus of claim 1 including a generally vertically extending divider having perforated walls, the perforations of said divider having means for imparting a transverse component to the direction of travel of steam rising substantially vertically said means for imparting comprising deflector zones adjacent said perforations and positioned to guide the steam after passage through the perforation.

3. The apparatus of claim 1 in which each of the perforations has a deflector zone adjacent thereto, the deflector zone extending out of the plane of the perforated food support.

4. The apparatus of claim 2 in which each of the perforations has a deflector zone adjacent thereto, the deflector zone extending out of the plane of the perforated divider.

5. The apparatus of claim 3 in which the deflector zones are integral with the perforated food support and have a free edge defining part of the periphery of the aperture of the associated perforation which is transverse to the plane of the perforated food support.

6. The apparatus of claim 4 in which the deflector zones are integral with the perforated divider and have a free edge defining part of the periphery of the aperture of the associated perforation which is transverse to the plane of the perforated divider.

7. The apparatus of claim 3 in which the deflector zones are inclined to the plane of the perforated food support and decrease in cross-sectional size from the aperture towards the food support.

8. The apparatus of claim 4 in which the deflector zones are inclined to the plane of the perforated divider and decrease in cross-sectional size from the aperture towards the divider.

9. The apparatus of claim 3 in which the perforated food support is made of sheet metal and the perforations are formed therein by forming cuts in the sheet material and deforming the material in the vicinity of the cut on at least one side thereof out of the plane of the sheet to provide deflector zones terminating in apertures to the perforations located in a plane substantially at right angles to the sheet.

10. The apparatus of claim 4 in which the perforated divider is made of sheet metal and the perforations are formed therein by forming cuts in the sheet material and deforming the material in the vicinity of the cut on at least one side thereof out of the plane of the sheet to provide deflector zones terminating in apertures to the perforations located in a plane substantially at right angles to the sheet.

11. The apparatus of claim 4 in which said deflector zones face downwardly when the divider is in its operative position.

12. The apparatus of claim 3 in which the deflector zones and the aperture of the perforations are directed in the same direction relative to a central point.

13. The apparatus of claim 12 in which the food support is of circular shape and the deflectors are directed in a radial direction.

14. The apparatus of claim 12 in which the food support is of circular shape and the deflectors are directed in a circumferential direction.

15. The apparatus of claim 12 in which the food support is of circular shape and the deflectors are directed in a direction between radial and circumferential in relation to said circular shape.

16. The apparatus of claim 1 in which the tubular body is open ended and adapted to be supported on a perforated support member of dished configuration for location on the upper periphery of a conventional cooking pot.

17. The apparatus of claim 1 in which the tubular body has means for supporting it on the upper periphery of a pot.

18. The apparatus of claim 1 in which the tubular body is provided with a removable lid having outlet apertures therethrough.

* * * * *